May 22, 1928.
L. P. PEKRUL
1,670,520
GATE CONNECTION FOR CORRUGATED CULVERTS
Filed Oct. 27, 1925
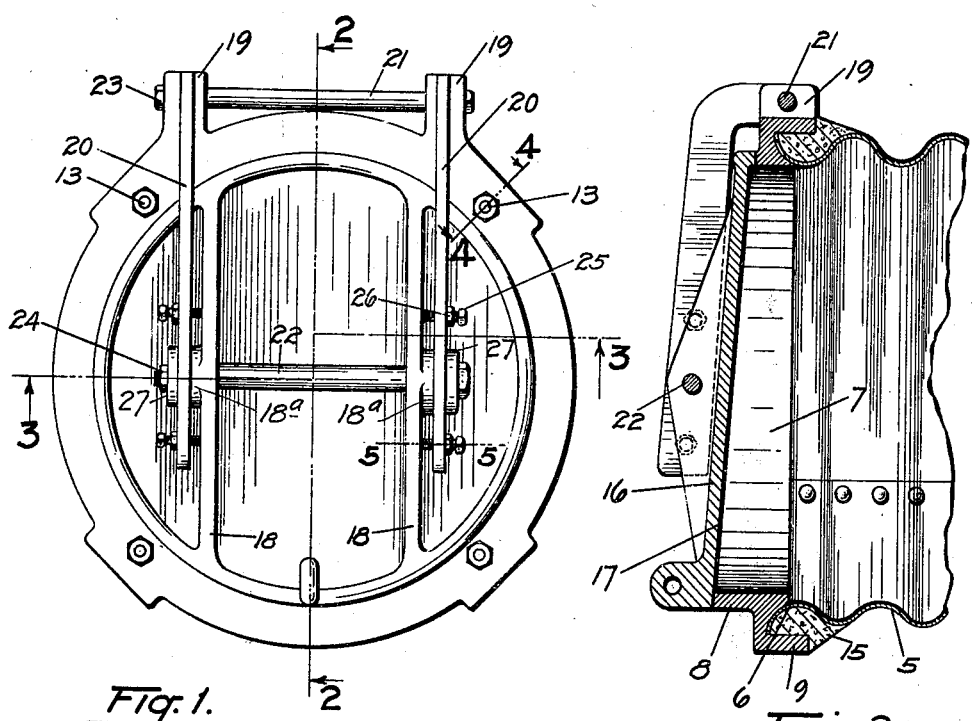
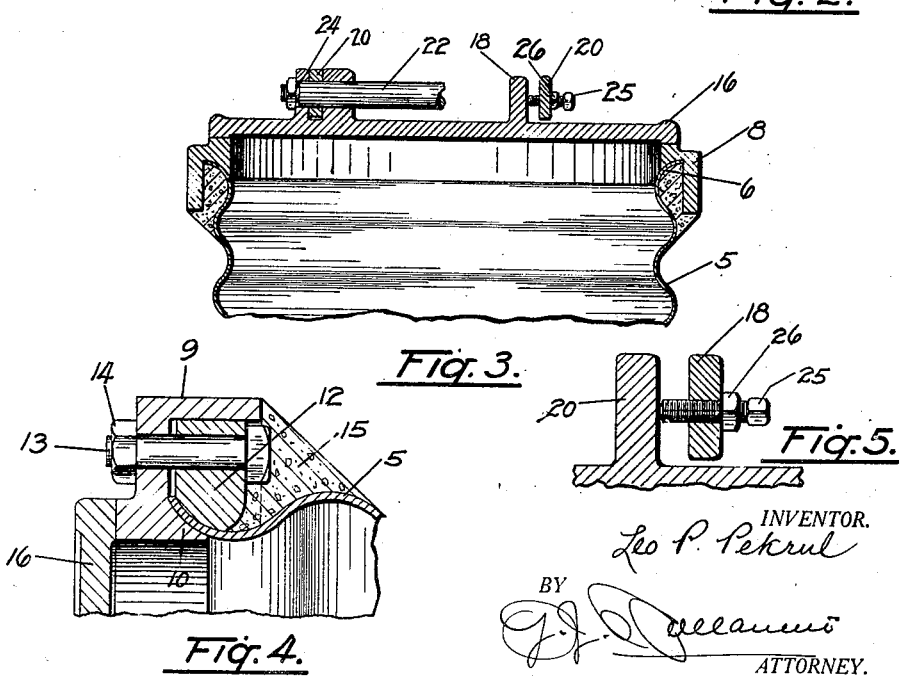
INVENTOR.
Leo P. Pekrul
BY
ATTORNEY.

Patented May 22, 1928.

1,670,520

UNITED STATES PATENT OFFICE.

LEO P. PEKRUL, OF DENVER, COLORADO.

GATE CONNECTION FOR CORRUGATED CULVERTS.

Application filed October 27, 1925. Serial No. 65,169.

My invention relates to improvements in flap gates or valves of the type employed to automatically control the flow of water through culverts and other conduits of irrigation and drainage systems, and more particularly to gates of the construction shown and described in my application for Patent Serial No. 759,094, filed December 30, 1924.

These gates are characterized by the provision of a slanting seat fixed at an end of the culvert, a gate-body normally engaging upon the seat to be separated therefrom by the outflow of water from the culvert, and a pair of links by which the gate-body is pivotally suspended.

Ears at the upper portion of the gate-seat, and ribs formed on the outside of the gate-body serve as means for the pivotal connection of the links, and the lower ends of the latter are extended beyond their pivotal axis on the gate-body to function as stops for the purpose of holding the body in a position relative to the links when the gate is open, which compels its proper re-engagement with the seat when the flow of water by which the gate was opened, has subsided.

While the arrangement of the gate-body relative to the suspension links holds the body against independent movement about its pivotal axis, no adequate means have heretofore been provided to prevent its lateral displacement, and it frequently occurs, particularly after a period of use, that by wear or by loosening or improper construction of the parts by which the gate body is mounted, the body is displaced to such an extent that its co-ordination with the seat is permanently defective and the gate does no longer perform the function for which it is provided.

With full cognition of the above stated detriment in the construction of gates of the described character, I have provided means to compensate for any lateral displacement of the gate-body relative to the suspension links or of the links relative to the frame on which the gate is mounted, and it is the object of the present invention to attain this result by means of a fixed guiding element and by a simple and efficient adjustment, whereby the position of the gate relative to the links may be varied to any desired degree within the extent of the movement permitted by the play between the parts included in the mounting.

An embodiment of the invention has been illustrated in the accompanying drawings in which like parts are similarly designated, and in which Figure 1 represents a face view of the gate at an end of a corrugated metal culvert, Figure 2, a vertical section on the line 2—2 of Figure 1, Figure 3, a horizontal section in two planes indicated by the line 3—3 of Figure 1, Figure 4, an enlarged section taken on the line 4—4 of Figure 1, and Figure 5, an enlarged section taken on the line 5—5 of Figure 1.

Referring more specifically to the drawings, the numeral 5 designates a culvert made of corrugated sheet metal, and having at or near its end an outwardly flaring flange 6 as a natural consequence of its transverse corrugation.

A gate-frame 7 comprises a flat ring 8, having at its outer circumference a laterally projecting annular rim 9 which embraces the culvert. The ring at its inner circumference has an annular lip 10 adapted to engage the inner surface of the flange 6 at the end of the culvert.

The frame is fastened to the culvert by means of clamp blocks 12 fitted in recesses of the rim and cooperating with the lip 10 to rigidly secure the frame in place. The blocks are to this end adapted to clamp the flange at the end of the culvert upon the lip, and they are fastened in their clamping position by bolts 13 fitted in alined holes of the blocks and the ring-portion of the frame, and nuts 14 screwed upon the protruding ends of the bolts.

The space between the rim 9 and the culvert is filled with cement, as shown at 15, to provide a rigid connection of the frame with the culvert and to insure a leak-proof joint.

The circular gate-body 16, which normally engages a slanting annular seat 17 at the outer edge of the frame, has two parallel ribs 18, provided with alined apertures for their connection with the links 20 by which the gate is pivotally mounted on the frame.

The frame is to this end provided with upstanding longitudinally slitted and transversely apertured ears 19, and the links above referred to are pivotally attached to the frame and the gate by headed rods 21 and 22, passed through the holes of the ears and the ribs and therewith registering apertures in the end-portions of the links, the rods being secured against lengthwise movement by nuts 23 and 24 screwed upon their threaded extremities.

The upper ends of the links are bent laterally to enter the slots of the ears of the frame, and their opposite ends are extended beyond the bolt 22 to provide stops, which by engagement with the outer surface of the gate, limit its pivotal movement on the links.

The seat 17 on the frame, which slants from the perpendicular, supports the gate in its normal, closed position, and if by an outflow of water, it is opened by movement about the pivotal axis provided by the rod 21, it falls back to its original position as soon as the flow of water has subsided.

It is evident that the several joints included in the mounting of the gate as hereinabove described, are liable to afford play for the lateral displacement of the gate-body, especially in case of wear or faulty construction, and that such displacement, if permitted to continue, will result in an imperfect contact between the gate and its seat and consequent leakage of water from the culvert after the gate is closed.

The means provided in accordance with my invention to remedy this defect in the mounting, consists of lugs 27 formed integrally with the gate-body at opposite sides of the links to form, together with bosses 18ª on the ribs 18, channels in which the links 20 are movably fitted. The pivot bolt 22 is lengthened to extend through apertures in the lugs, alined with those of the ribs.

Under ordinary conditions, the lugs will tend to hold the gate against lateral displacement relative to the links and the links are prevented from moving sideways by the position of their bent upper extremities in the slots of the ears 19 of the frame. Notwithstanding these precautionary methods, it is a common occurrence that after a comparatively short period of use, the gate becomes displaced to such an extent that when it falls back upon its seat, its position relative thereto is out of adjustment, with the result that the gate no longer closes the culvert against the outflow of water below the pressure required to raise it from its seat, and that either replacement, or difficult repairs and readjustment are required in order to restore the parts to their original condition. In order to eliminate this detrimental feature in the construction of the gates, I have provided four headed adjusting screws 25 arranged oppositely in pairs above and below the pivotal axis of the gate on the links and extending through correspondingly threaded openings of the links to bear upon the ribs of the gate-body. Lock nuts 26, bearing upon the inner surfaces of the links, hold the screws in their adjusted positions.

It will be readily seen that by proper adjustment of the screws, the gate-body may be laterally adjusted in either a straight, horizontal or tilting direction to its proper position relative to the seat on the frame. This adjustment may be made either at the time the gates are made or applied or after they have been in use without the employment of skilled labor and without the use of tools other than a wrench fitted upon the heads of the set screws and their lock nuts, and it is evident that the slotted ears on the frame, the lugs on the gate-body and the screws on the links cooperatively provide a simple and efficient expedient to permanently maintain the gate structure in a condition to properly perform its function, irrespective of faults in the construction of its parts or wear caused by frequent movements and by the destructive effect of grit and rust.

Having thus described my invention, what I claim and desire to secure by Letters Patent is:

1. In culvert gates, the combination with a frame having a gate-seat, a gate-body normally engaging the seat, and an element suspending the gate-body on the frame, of means adapted to adjust the position of the gate-body relative to the suspension element.

2. In culvert gates, the combination of a frame having a gate-seat, a gate-body normally engaging the seat, links for the suspension of the gate, pivotally connected with the frame and with the gate-body, and screws on the links bearing upon the body for its lateral adjustment.

3. In culvert gates, the combination of a frame having a gate-seat, a gate-body normally engaging the seat, links for the suspension of the gate, pivotally connected with the frame and with the gate-body, and oppositely disposed screws on the links bearing upon the body for its lateral adjustment.

4. In culvert gates, the combination of a frame having a gate-seat, a gate-body normally engaging the seat, links for the suspension of the gate, pivotally connected with the frame and with the gate-body, and screws on the links bearing upon the body above and below its pivotal axis, for its lateral adjustment.

5. In culvert gates, the combination of a frame having a gate-seat, a gate-body normally engaging the seat, links for the suspension of the gate, pivotally connected with the frame and with the gate-body, screws on the links bearing upon the body for its lateral adjustment, and means for locking the screws in their adjusted positions.

6. In culvert gates, the combination of a frame having a gate-seat, a gate-body normally engaging the seat and provided with ribs, links for the suspension of the gate, pivotally connected with the frame and pivoted on the ribs of the gate-body, and screws engaging the links and the ribs for lateral adjustment of the gate-body.

7. In culvert gates, the combination of a frame having a gate-seat, a gate-body normally engaging the seat and provided with ribs, links for the suspension of the gate, pivotally connected with the frame and pivoted on the ribs of the gate-body, and screws engaging the links and the ribs above and below the pivotal axis of the gate-body for lateral adjustment of the body.

8. In culvert gates, the combination of a frame having a gate-seat and vertically slotted ears, a gate-body normally engaging the seat and having vertical channels, links movably fitted in the slots of the ears and the channels and pivoted on the ears and the gate-body, and screws engaging the links and the gate-body for lateral adjustment of the body.

9. In culvert gates, the combination of a frame having a gate-seat and vertically slotted ears, a gate-body normally engaging the seat and having vertical channels, links movably fitted in the slots of the ears and the channels and pivoted on the ears and the gate body, and screws on the links.

10. In culvert gates, the combination of a frame having a gate-seat, a gate-body normally engaging the seat and having vertical channels, links movably fitted in the channels and pivoted on the frame and the gate-body, and screws engaging the links and the gate-body for lateral adjustment of the body.

In testimony whereof I have affixed my signature.

LEO P. PEKRUL.